L. S. WRIGHT.
Machines for Making Toe-Calks.
No. 158,819. Patented Jan. 19, 1875.
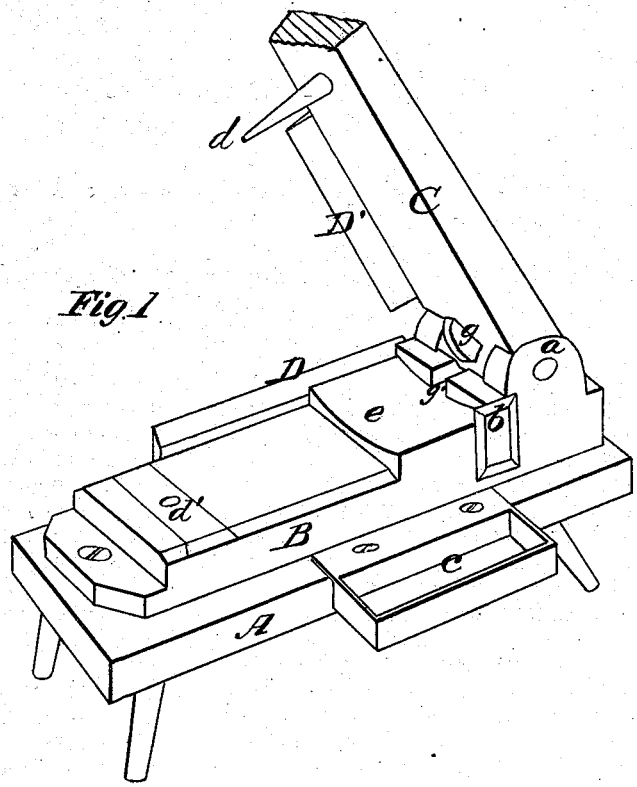
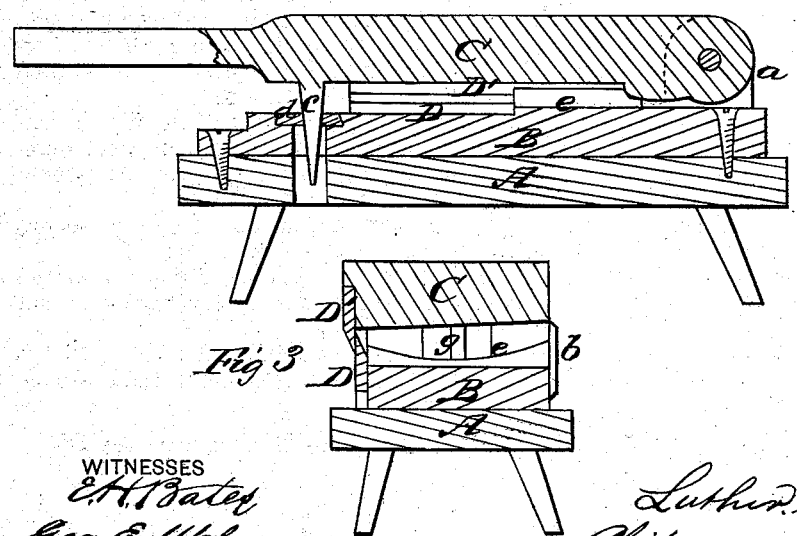
WITNESSES
E. H. Bates
Geo. E. Upham
INVENTOR
Luther S. Wright
By Chipman Hosmer & Co
ATTORNEYS.

UNITED STATES PATENT OFFICE.

LUTHER S. WRIGHT, OF GROTON, ASSIGNOR OF ONE-HALF HIS RIGHT TO ORLANDO BENTLEY, OF MARATHON, NEW YORK.

IMPROVEMENT IN MACHINES FOR MAKING TOE-CALKS.

Specification forming part of Letters Patent No. 158,819, dated January 19, 1875; application filed March 7, 1874.

*To all whom it may concern:*

Be it known that I, LUTHER S. WRIGHT, of Groton, in the county of Tompkins and State of New York, have invented a new and valuable Improvement in Toe-Calk Machines; and I do hereby declare that the following is a full, clear, and exact description of the construction and operation of the same, reference being had to the annexed drawings, making a part of this specification, and to the letters and figures of reference marked thereon.

Figure 1 of the drawing is a representation of a perspective view of my toe-calk machine. Fig. 2 is a longitudinal sectional view of the same. Fig. 3 is a transverse sectional view.

This invention has relation to machinery for making toe-calks for horseshoes, which calks are short curved pieces of metal having projections formed on them, which are welded into the shoes.

The nature of my invention consists in the novel construction and arrangement of the devices hereinafter more fully described and claimed.

The following is a description of my improved machine:

In the annexed drawings, A designates a bench, on which the machine is supported, and B represents a solid block of metal, having ears $a$ formed on one end, to which a hand-lever, C, is pivoted. On one side of a concave bed, $e$, near the pivot of lever C, is a cutter, D, which operates in combination with a cutter, D', on one side of the lever C, to cut off the calks from the bars. Opposite the fixed knife D is a gage, $b$, against which the bars are adjusted before bringing down the lever C and cutting off the calks. By means of this gage $b$ the calks are all made of an equal length. The pivoted end of the lever C has formed on or secured to its under side, and at the middle of its width, a die, $g$, which is slightly rounded longitudinally, and which is received into a recess formed in an elevated portion of the block B, as shown at $g'$, Figs. 1 and 3, when the lever C is fully depressed. It is by means of this die $g$ and its recess $g'$ that the metal forming the calks is upset and a fin or projection is formed on it.

It will thus be seen that I gage the length of a calk, cut it from its bar, and form the projection on it at one downward stroke of the lever C. The block $e$ being concave, and the lever $c$ having its under surface plane, will give the heated calk a curved shape, to correspond with the curve of the horseshoe, at the same time re-enforcing the metal toward the center, and thereby assisting in the formation of the spur of the calk.

On one side of the bench A I secure a box, C, to receive the finished calks, and to the lever C, near its handle, I secure a punch, $d$, which may be removable, and which is received into a removable plate, $d'$, dovetailed into the upper side of the block B.

I disclaim the combination, broadly, in machines of the kind and for the purpose hereinbefore described, of the die, die-bed, punch, lever, and shears; but

What I claim as new, and desire to secure by Letters Patent, is—

The transversely-concave die-bed, and the combination therewith of the gage $b$, as set forth.

In testimony that I claim the above I have hereunto subscribed my name in the presence of two witnesses.

LUTHER S. WRIGHT.

Witnesses:
   W. W. HARE,
   EZRA HALSEY.